Aug. 30, 1938.　　　A. M. VEDOE　　　2,128,785
OVEN REGULATOR
Filed Sept. 8, 1931　　　2 Sheets—Sheet 1

Inventor
Anton M. Vedoe
by Kenway + Witter
Attorneys

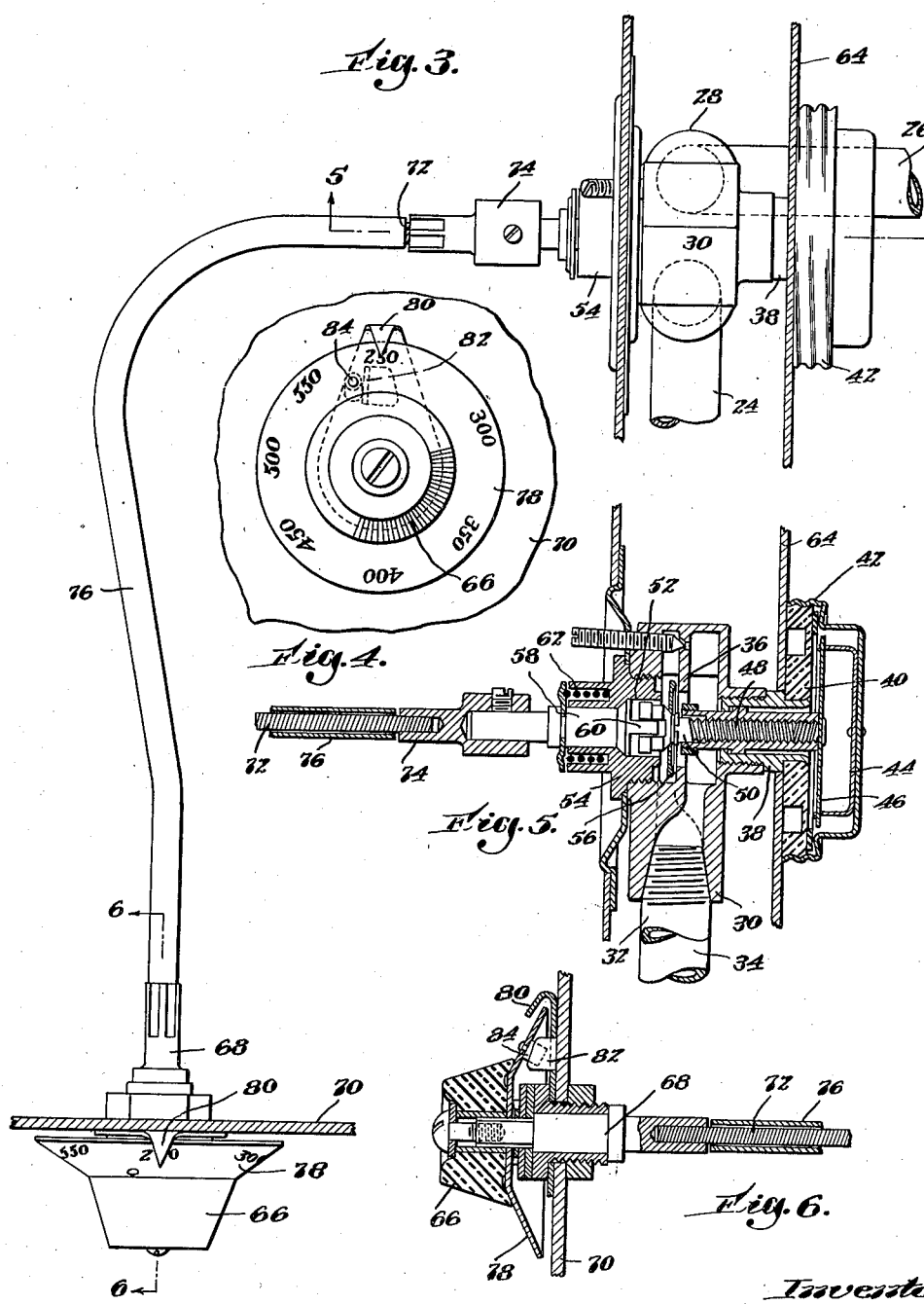

Patented Aug. 30, 1938

2,128,785

UNITED STATES PATENT OFFICE 2,128,785

OVEN REGULATOR

Anton M. Vedoe, Wollaston, Mass., assignor, by mesne assignments, to Robertshaw Thermostat Company, Youngwood, Pa., a corporation of Pennsylvania Application September 8, 1931, Serial No. 561,547

1 Claim. (Cl. 236—15)

This invention relates to gas ovens, and more especially to the thermostatic regulators therefor. The invention is especially applicable to baking ovens which have heretofore been commonly equipped with thermostatic regulators for controlling automatically the oven heat. These regulators have most commonly been mounted on a side wall of the oven wherefrom they extend inwardly into the oven. The knob or like member for manually adjusting the regulator has been extended outwardly of the said wall and in such position has been inconvenient to reach and manipulate. One of the objects of my invention is to provide an improved manual adjustment for these regulators which can be located in the most convenient position on the stove or range, preferably alongside the grid burner controls thereof.

The nature of my invention is such that the regulating valve and the manually adjustable member therefor may be quite remotely separated and, furthermore, that the rotary axis of the member may be relatively angular to the axis of the valve. These features permit of great latitude in mounting the adjusting member in the most convenient position on the stove. The means whereby these functions are accomplished preferably includes a flexible shaft connecting the member and valve, and it is another object of my invention to provide improved means of this nature and for the purpose stated.

In the accompanying drawings I have shown one specific embodiment of my invention but it will be understood that the invention can be otherwise embodied and that the drawings are not to be construed as defining or limiting the scope of the invention, the claim appended hereto being relied upon for that purpose.

Referring to the figures of the drawings,

Fig. 3 is an enlarged plan view showing the invention;

Fig. 4 is a front view of the manually adjustable member;

Fig. 5 is a vertical section taken on line 5—5 of Fig. 3; and

Fig. 6 is a vertical section taken on line 6—6 of Fig. 3.

Figures 1, 2:
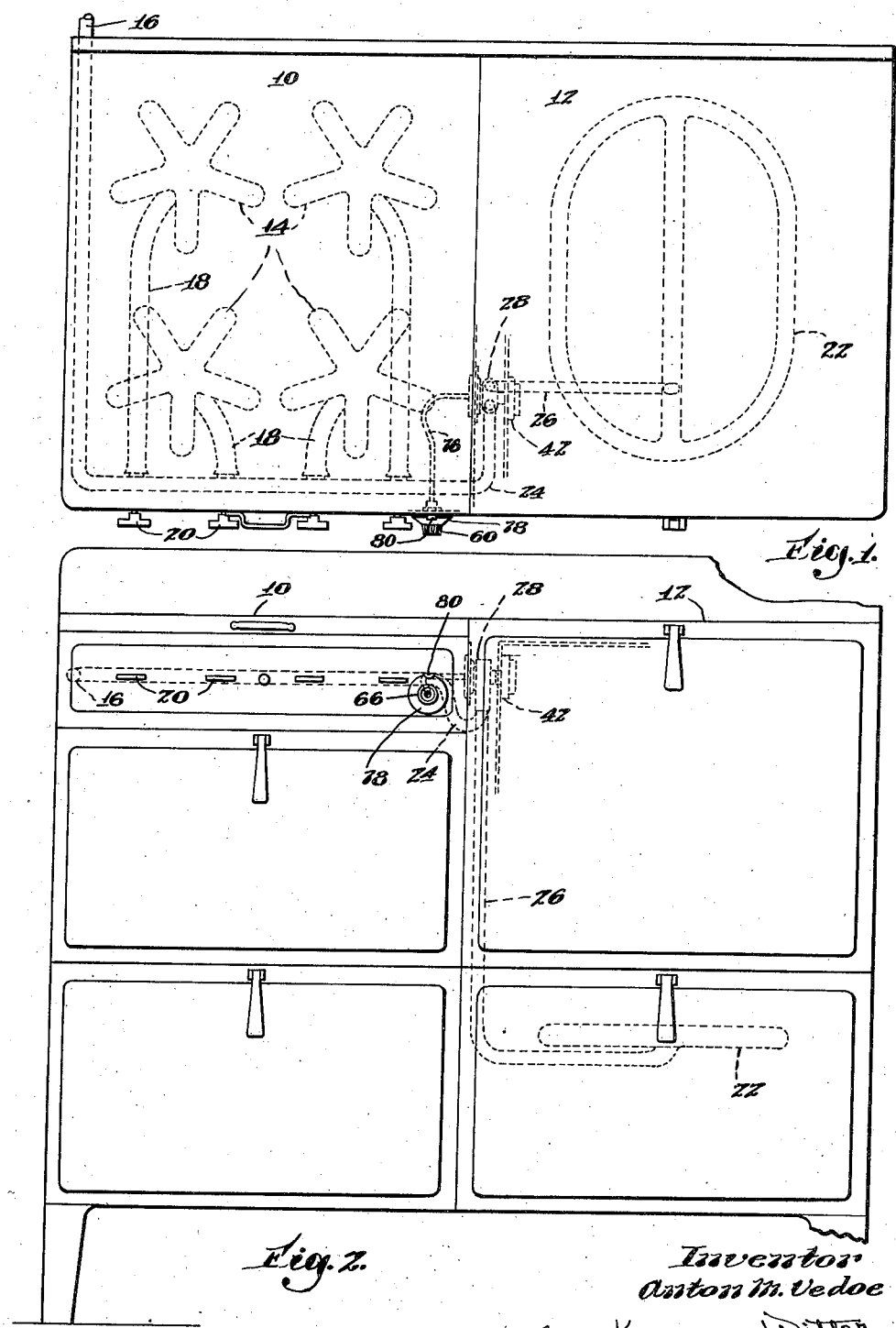
Fig. 1 is a plan view of a gas range having my invention applied thereto.
Fig. 2 is a front view of the range.

In the drawings I have illustrated my invention in connection with a gas range having a grid section 10 and an oven section 12. Within the grid section are a plurality of burners 14 receiving gas from a pipe 16 through branch pipes 18. The gas to the burners is controlled by valves 20 conveniently arranged along the front of the stove. The oven 12 is heated by a burner 22 receiving gas from the pipe 16 and connecting pipes 24 and 26 through a regulating valve 28. The oven heat if modern gas ranges is controlled automatically by thermostats combined with the gas valves and located in the ovens. These thermostatic regulators are commonly mounted on the side walls of the ovens, the thermostat projecting from the regulator valve into the oven, and a manual adjustment therefor projecting outwardly through the oven wall. The regulator is manually set to the desired temperature position by this adjustment and it is, therefore, necessary to both observe and manipulate the same and, as heretofore located, the performing of these functions has been quite inconvenient. The primary object of my invention is to provide a new and improved combination whereby the manual adjusting means may be most conveniently located on the range, preferably along with the other controlling valves 20, and without affecting the location of the thermostatic regulator. I will now proceed to describe the specific combination illustrated in the drawings.

The thermostatic regulator at 28 comprises a body member 30 having gas inlet and outlet ports 32 and 34 and a valve seat 36. Threaded openings are provided in the front and rear walls of the member 30 and means extending through these openings are respectively adapted manually to adjust the fuel controlling valve and to control automatically the same in accordance with the oven temperature. A bushing 38 is threaded into the rear wall opening and mounted on the outer end of this bushing is a disk 40 of asbestos or the like providing a heat insulating wall between the body member 30 and the thermostatic element of the regulator. Mounted on the disk 40 is a metal cap 42 having a U-shaped thermostatic member 44 secured to its inner face. The two ends of this member are connected by a thin flexible plate 46. Secured to the central portion of the plate 46 and extending into the bushing 38 is an internally threaded stud 48. This stud and plates 44 and 46 are assembled together and onto the member 42 and this member is thereafter threaded onto the peripheral edge of the disk 40.

A valve stem 50 has one end portion threaded into the stud 48 and its other end is rotatably supported in the inner end of a bore 52 through a bushing 54 threaded into the opening in the front wall of the body 30. The valve which cooperates with the valve seat comprises a disk 56 loosely mounted on the valve stem. The valve may be manually moved as hereinafter described by rotating the valve stem and the valve is automatically moved in both directions by longitudinal movement of the valve stem under the influence of the thermostatic plate 44. The threads on the stem 50 are of such coarse pitch that one complete turn of the stem will move the valve through its full range. The valve stem may be manually rotated and thereby move the valve toward or from its seat by means of a stem 58 within the bore 52. This stem has a tongue and groove connection 60 with the valve stem whereby to permit manual rotation of the valve stem thereby without interfering with longitudinal movement of the valve stem under the action of the thermostat 44. A spring 62 acts to hold the stem 58 in its fully retracted position.

The regulator member 28 is mounted in one side wall of the oven and the thermostat carrying cap 42 extends through a liner wall 64 into the oven. The outer end of the stem 58 projects through the side wall of the oven at a place remote from the front of the range and, therefore, incovenient of access. The function of my invention is to provide means conveniently located at the front of the range and in connection with this stem for manually adjusting the regulator. This means, as illustrated, comprises an adjusting knob 66 on a stem 68 rotatably mounted in a supporting plate 70 in line with the valve adjustments 20.

The axes of the stems 68 and 58 are relatively right angular and in accordance with my invention are connected by a flexible shaft 72. This shaft may comprise two wire coils wound together in opposite directions whereby to permit full lateral flexibility but not permitting any rotative flexibility. The inner end of the shaft may have a member 74 secured thereto for permitting easy connection to the stem 58. The shaft is housed within a tube 76 which may be bent to any convenient shape. The manual adjustment is indicated by a dial 78 carried on the reduced outer end of the stem 68 and cooperating with an index pointer 80. Cooperating stops 82 and 84 are provided for limiting the rotative movement of the stem and dial.

It is believed that the use and advantages of my invention will be clearly apparent. It is highly desirable that the thermostatic regulator shall be located in the most suitable position within the oven and also very desirable that the adjusting knob 66 and dial 78 shall be located in the position most convenient to manipulate and observe. The application of my invention to these elements permits them both to be thus located and, furthermore, adds considerably to the attractive appearance of the range.

Having thus described my invention, what I claim as new and desire to secure by Letters Patent is:

In combination, a plurality of open burners, a gas manifold extending along said burners and adapted for supplying gas thereto, an oven, a thermally operated device disposed within the oven, a controlling device disposed within the oven and in proximity to said thermally operated device, a selecting device adjacent the manifold and flexible rotatable means operatively connecting said selecting device and said controlling device.

ANTON M. VEDOE.